Dec. 6, 1960

S. A. BROSKY 2,963,581

METHODS AND APPARATUS FOR DETECTING RADIOACTIVE DECAY

Filed May 17, 1955

INVENTOR
Stanley A. Brosky

United States Patent Office 2,963,581
Patented Dec. 6, 1960

2,963,581

METHODS AND APPARATUS FOR DETECTING RADIOACTIVE DECAY

Stanley A. Brosky, 500 Arch St., Pittsburgh, Pa.

Filed May 17, 1955, Ser. No. 508,909

4 Claims. (Cl. 250—83)

This invention relates to apparatus and methods for the detection of radioactive decay and is particularly adapted for use in prospecting for materials undergoing radioactive decay and disintegration.

The detection of radioactive decay has been heretofore accomplished by the use of Geiger counters and similar devices which are activated by gamma rays resulting from radioactive decay and disintegration. Alternatively, it has been proposed to use relatively complex devices incorporating fluorescent screens which are activated by the gamma rays produced during radioactive decay. All of these methods suffer from the difficulty of distinguishing between the gamma radiation produced during radioactive decay and the gamma ray constituent of cosmic rays or gamma radiation from the earth. The result is that unless there is a considerable differential in level between the gamma radiation produced by the radioactive decay and that normally surrounding the earth's crust, it is virtually impossible to distinguish and locate bodies of ores which are undergoing radioactive decay. Bodies of ores which are of low concentration or which are buried under considerable depths of other materials are, as a result, usually passed by and not discovered.

I have discovered a method and an apparatus by means of which very low concentrations of radioactive materials may be detected and by means of which radioactivity in minute samples may be detected. For example, the method of my invention may be applied to fragments produced by drilling as in the case of oil wells and the like. I provide a method for detecting radioactive decay comprising the steps of enclosing a photosensitive film within a lightproof container, placing a sample to be tested adjacent the photosensitive film and spaced therefrom by a layer of material capable of transmitting to the photosensitive sheet without substantial impairment the energy released during radioactive decay, exposing the photosensitive film to the action of the material to be tested for a predetermined time and viewing the photosensitive film to determine the effect of the material to be tested thereon. Preferably, I expose the film to a standard sample of material undergoing radioactive decay simultaneously with its exposure to the material being tested at spaced apart points and compare the resulting images to evaluate the content of material undergoing decay. In order to accomplish this, I provide an apparatus comprising photosensitive film, a lighttight container for said film and means for holding a portion of material to be tested adjacent the photosensitive film and spaced therefrom by a layer of material capable of transmitting without substantial impairment the energy released during radioactive decay to the photosensitive film. By my method, I recover the energy of both the alpha and beta radiation which is ineffective under the ordinary methods used for testing and in this way I am able to distinguish radiation produced by radioactive decay from that normally surrounding the earth's crust even where the amount of material undergoing radioactive decay is small. In this way, I am able to detect bodies of material undergoing radioactive decay which were heretofore undiscovered and indistinguishable by the means known to the art.

In the foregoing statement, I have set out certain advantages, purposes and objects of this invention. Other objects, purposes and advantages will be apparent from a consideration of the following description and the accompanying drawings in which—

Figure 1:
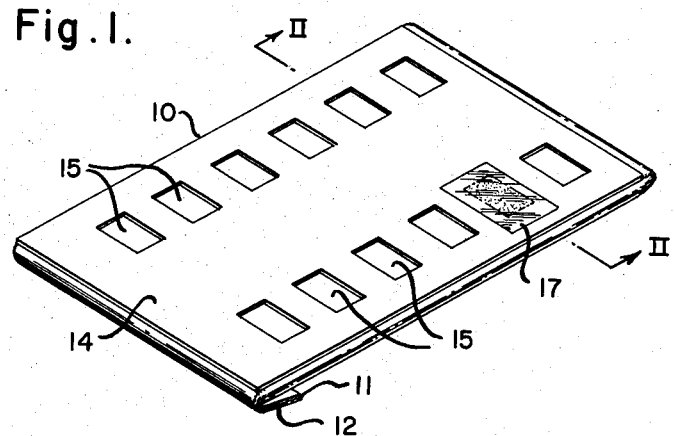
Figure 1 shows an isometric view of a preferred means for determining radioactive decay according to my invention.

Referring to the drawings I have illustrated a lightproof container 10 in the form of an aluminum foil envelope having an opening 11 at one end, covered by a flap 12. A photosensitive sheet 13 is inserted into the container 10 through the opening 11. A sheet of cardboard 14 or similar material capable of absorbing alpha and beta radiation is fixed to one side of the container 10 and is provided with spaced openings 15 therein. A material 16 to be tested is placed in one of the openings 15 and covered by a piece of pressure sensitive tape 17 or similar sealing means. A known standard sample of material undergoing radioactive decay may be inserted in an adjacent opening 15 at the same time as the material 16. The alpha and beta radiation emitted by the decaying radio active material will pass through the foil cover and activate the photosensitive film. The exposed film is removed from the container and developed in the usual manner. The amount of blackening in a given time of exposure gives a general index of the quantity of decay taking place in the sample. The use of a standard known sample provides a comparison of the images caused by the material to be determined and the known sample so a more accurate estimate of the amount of radioactive substances in the material to be determined can be made.

Figure 2:
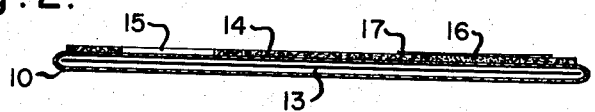
Figure 2 is a section on the line II—II of Figure 1.
Figure 3:
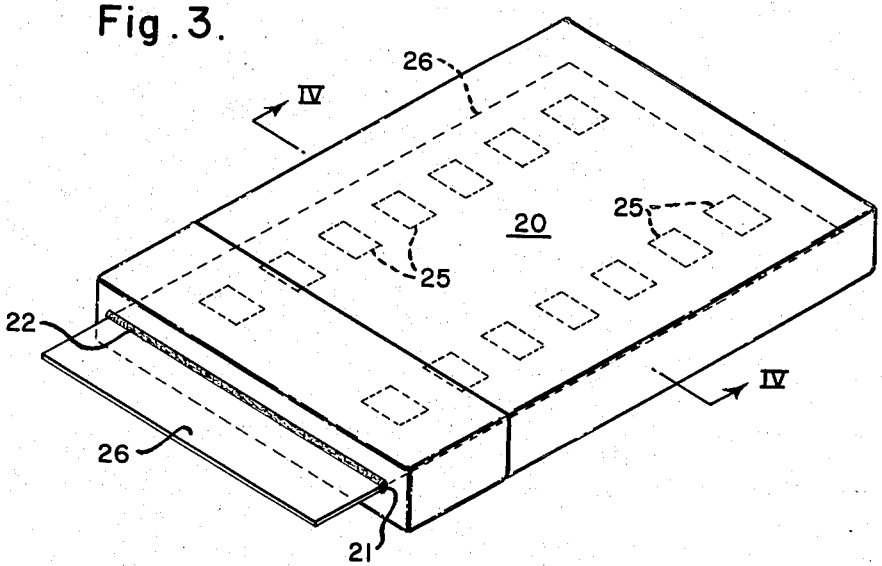
Figure 3 is an isometric view of a second embodiment of my invention.
Figure 4:
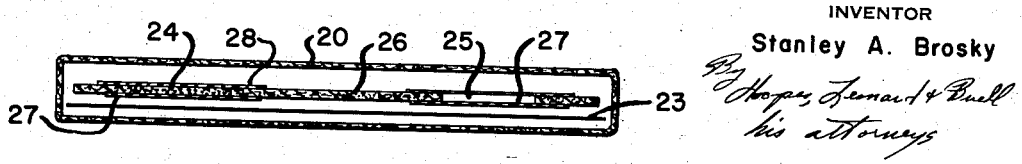
Figure 4 is a section on the line IV—IV of Figure 3.

In the embodiment shown in Figures 3 and 4 an outer lightproof container 20 is provided having a slot 21 in one end provided with a resilient light sealing flap 22. A photosensitive sheet 23 is placed in the container 20. A sample of material 24 to be tested is placed in an opening 25 in a sample holder 26 of cardboard or similar material capable of absorbing alpha and beta radiation. A thin sheet of mica 27 is glued to the cardboard beneath the opening 25 and a pressure sensitive tape 28 or similar closure is placed over the top of the opening 25. The sample holder 26 is inserted through the slot 21 and resilient light sealing flap 22 into the interior of the container 20 with the mica sheet adjacent the sensitized sheet 23. As in the case of the embodiment illustrated in Figures 1 and 2 the alpha and beta particles can pass through the thin mica sheet directly onto the sensitized sheet and react thereon to form an image which is completed by development in the usual manner.

Either of the embodiments described above can be taken into the field by a prospector, loaded and returned to a laboratory for evaluation. In this case the exposure of the sensitized sheet would take place in transit. Alternatively, the prospector could develop the sheet and evaluate the results in the field after allowing a proper period of exposure.

The method and apparatus of this invention have the advantages of lightweight, portability, sensitivity to very small amounts of radioactive decay or radioactive fall out, freedom from interference from sources outside the samples, ease of handling and the ability to handle a large number of samples with a small investment in capital.

While I have illustrated and described certain preferred practices and apparatus for carrying out my in-

I claim:

1. The method of prospecting for materials undergoing radioactive decay comprising the steps of enclosing a photosensitive film within a lightproof container, placing a sample to be tested in intimate contact with a layer of material capable of transmitting to the photosensitive film without substantial impairment the energy released during radioactive decay, said layer of material lying between the film and sample, exposing the film to the action of the material to be tested and comparing the resulting image with an image produced by a standard sample undergoing radioactive decay.

2. The method of prospecting for materials undergoing radioactive decay comprising the steps of enclosing a photosensitive film within a lightproof container, placing a standard radioactive sample and a sample to be tested in intimate contact with a layer of material capable of transmitting to the photosensitive film without substantial impairment the energy released during radioactive decay, said layer of material lying between the film and sample, exposing the photosensitive film to the action of the standard sample and the sample to be tested and comparing the resulting images to determine the radioactive level of the sample to be tested.

3. The method of prospecting for materials undergoing radioactive decay comprising the steps of enclosing a photosensitive film within a lightproof container, placing a sample to be tested in intimate contact with a layer of material capable of transmitting to the photosensitive sheet without substantial impairment the energy released during radioactive decay, said layer of material lying between the film and sample, exposing the photosensitive film to the action of the material to be tested for a predetermined time and viewing the photosensitive film to determine the effect of the material to be tested thereon.

4. Means for detecting radioactive decay comprising a photosensitive film, a lighttight container for said film, and means for holding a portion of material to be tested adjacent said photosensitive film and spaced therefrom by a layer of material capable of transmitting without substantial impairment the energy released during radioactive decay to the photosensitive film, said holding means maintaining the sample in intimate contact with the layer of material capable of transmitting alpha and beta energy.

References Cited in the file of this patent

UNITED STATES PATENTS

| | | |
|---|---|---|
| 2,496,218 | Kieffer | Jan. 31, 1950 |
| 2,551,449 | Menke | May 1, 1951 |
| 2,562,969 | Teichmann | Aug. 7, 1951 |
| 2,603,755 | De Ment | July 15, 1952 |
| 2,680,816 | Stern | June 8, 1954 |
| 2,733,353 | Pirson | Jan. 31, 1956 |
| 2,775,710 | Ludeman | Dec. 25, 1956 |